3,538,124
METHOD FOR THE PRODUCTION OF
3,4-EPOXY-2-METHYL-1-BUTENE
Ming Nan Sheng, Cherry Hill, N.J., and John G. Zajacek, Strafford, Pa., assignors to Atlantic Richfield Company, New York, N.Y., a corporation of Pennsylvania
No Drawing. Continuation-in-part of application Ser. No. 695,540, Dec. 6, 1967. This application May 23, 1969, Ser. No. 827,433
Int. Cl. C07d 1/12, 1/08
U.S. Cl. 260—348.5      4 Claims

ABSTRACT OF THE DISCLOSURE

Method for producing 3,4-epoxy-2-methyl-1-butene by epoxidizing isoprene utilizing an organic hydroperoxide and a molybdenum catalyst to produce a reaction product containing the 3,4-epoxy-2-methyl-1-butene and the 3,4-epoxy-3-methyl-1-butene, extracting the reaction product with water, leaving an organic layer containing the desired 3,4-epoxy-2-methyl-1-butene compound.

CROSS-REFERENCE TO RELATED APPLICATIONS

This application is a continuation-in-part of our copending application Ser. No. 695,540, filed Dec. 6, 1967, now abandoned entitled Isoprene Monoxide and Polymers Thereof.

BACKGROUND OF THE INVENTION

Field of the invention

This invention relates to a method for the production of 3,4-epoxy-2-methyl-1-butene by epoxidation of isoprene and recovery by water extraction of the reaction product.

PRIOR ART

It is well known that 3,4-epoxy-3-methyl-1-butene can be prepared either by the bromohydrin method with a yield of about 40 percent or by the peracid method such as the perbenzoic acid method with about the same 40 percent yield. This isomer is the only one produced by these methods, however.

Belgian Pat. No. 674,076 dated June 20, 1966 discloses a method for the epoxidation of olefinic compounds using a molybdenum-containing catalyst and an organic hydroperoxide oxidizing agent. If this method is used to epoxidize isoprene it has been found that two isomeric epoxides are produced contrary to the results obtained when other epoxidation methods are employed. There is produced the 3,4-epoxy-3-methyl-1-butene as produced by the prior art and also the 3,4-epoxy-2-methyl-1-butene.

SUMMARY OF THE INVENTION

This invention is concerned with a method for producing 3,4-epoxy-2-methyl-1-butene by the epoxidation of isoprene utilizing a molybdenum-containing catalyst and an organic hydroperoxide oxidizing agent and to the method for recovering this epoxy compound.

It is an object of this invention therefore to provide a method for the production of 3,4-epoxy-2-methyl-1-butene.

It is another object of this invention to provide a method for the production of 3,4-epoxy-2-methyl-1-butene by the epoxidation of isoprene and recovery of the compound from the epoxidation reaction product mixture.

Other objects of this invention will be apparent from the description and claims that follow.

DESCRIPTION OF THE PREFERRED EMBODIMENTS

In accordance with this invention isoprene is epoxidized utilizing the method of the aforementioned Belgian patent to produce two isomers, one being the 3,4-epoxy-3-methyl-1-butene and the other the 3,4-epoxy-2-methyl-1-butene.

It is preferred to employ as the catalyst a molybdenum compound which is soluble in the reaction mixture. The particular molybdenum catalyst employed is not critical, however, and any of those described in the Belgian patent above mentioned can be used.

Convenient catalysts are molybdenum hexacarbonyl and molybdenum oxacetylacetonate. A particularly preferred catalyst is that described in U.S. Pat. No. 3,434,975 (1969). This catalyst is produced by reacting molybdenum metal with a peroxy compound in the presence of a saturated alcohol having from 1 to 4 carbon atoms.

The particular organic hydroperoxide employed also is not critical and any of those shown in the Belgian patent can be used. These have the general formula ROOH wherein R is alkyl, aryl, alkaryl, aralkyl, cycloalkyl and the like, including these groups with various substituents. Preferred compounds are tertiary butyl hydroperoxide and cumene hydroperoxide.

Although the reaction can be carried out in the absence of a solvent, if it is desired to employ a solvent, a preferred solvent is benzene, although the conventional solvents for this process also can be used, for example, tertiary butyl alcohol, acetone, 2,2,4-trimethylpentane and the like.

The reaction temperature which is preferable is in the range of from 70° C. to 120° C. with 80° C. to 90° C. being more preferred. Superatmospheric pressures corresponding to those required to maintain the reactants in the liquid phase are employed. The ratio of hydroperoxide to isoprene can be varied as shown in the Belgian patent although it is preferred to use a molar excess of the isoprene over the hydroperoxide.

The catalyst is present in catalytic amounts, for example, from 20 p.p.m. molybdenum to 1000 p.p.m. molybdenum by weight based on the weight of the reactant mixture. Somewhat more preferable amounts are from 100 p.p.m. to 700 p.p.m. molybdenum based on the amount of reactant mixture.

The reaction is carried out for a time sufficient to substantially completely convert the hydroperoxide. In general, the time will be a function of the particular reaction temperature used within the limits set forth above. These times in general range from about 15 minutes to two hours, although the time is not extremely critical.

The reaction product is composed of unreacted isoprene and a small amount of hydroperoxide that may remain unconverted, the alcohol corresponding to the reduced hydroperoxide and the two isomers of the epoxidized isoprene, i.e. the 3,4-epoxy-2-methyl-1-butene and the 3,4-epoxy-3-methyl-1-butene. The epoxidized compounds can be separated from the other components for example by distillation and thereafter water is added to the mixture of isomers. The 3,4-epoxy-3-methyl-1-butene compound reacts with the water at room temperature to form the diol that goes into the aqueous phase leaving the desired 3,4-epoxy-2-methyl-1-butene isomer as an organic phase. The 3,4-epoxy-3-methyl-1-butene can also be reacted with water at higher temperatures but temperatures above about 35° C. are not preferred since conversion of the 3,4-epoxy-2-methyl-1-butene should be avoided.

Alternatively, the reaction product mixture can be extracted with water which will remove both the alcohol if it is water soluble such as tertiary butyl alcohol resulting from the reduction of tertiary butyl hydroperoxide, when the latter is used as the oxidizing agent, and the 3,4-epoxy-3-methyl-1-butene compound leaving only the unreacted isoprene and the 3,4-epoxy-2-methyl-1-butene isomer in the organic layer. After separating the organic layer from the aqueous layer by conventional methods such as decantation the isoprene, alcohol (if it is not water soluble such as cumenol) and 3,4-epoxy-2-methyl-1-butene compound can be separated by distillation.

The important step in the recovery of the 3,4-epoxy-2-methyl-1-butene compound is the water extraction step to remove the 3,4-epoxy-3-methyl-1-butene isomer which is converted to the diol and dissolves in the aqueous layer at room temperature. The amount of water required to remove the 3,4-epoxy-3-methyl-1-butene isomer should be in excess of the stoichiometric amount, although a large excess is not required.

After the water extraction step the desired 3,4-epoxy-2-methyl-1-butene remains in the organic layer from which it can be recovered by conventional distillation methods.

The following examples are provided for the purpose of illustrating the invention in greater detail but these should not be construed as limiting.

EXAMPLE I

A reactant mixture was prepared consisting of 1.0 g. of tertiary butyl hydroperoxide, 3.0 ml. of polymer grade isoprene, and 0.003 g. of molybdenum hexacarbonyl. The reaction was carried out under essentially anhydrous conditions in a sealed tube at 100° C. for 30 minutes. It was found that 99 weight percent of the hydroperoxide was converted and the total epoxide yield based on the amount of hydroperoxide converted was 75.8 weight percent with the yield of 3,4-epoxy-2-methyl-1-butene being 19 weight percent and the 3,4-epoxy-3-methyl-1-butene being 56.8 weight percent, each based on the amount of hydroperoxide converted.

EXAMPLE II

Another run like that of Example I was carried out using the same reactants in the same amounts but at a temperature of 90° C. for 64 minutes. It was found that 97.5 weight percent of the hydroperoxide was converted and the total epoxide yield based on the amount of hydroperoxide converted was 83.6 weight percent with the yield of 3,4-epoxy-2-methyl-1-butene being 20.9 weight percent and the yield of 3,4-epoxy-3-methyl-1-butene being 62.7 weight percent, each based on the amount of hydroperoxide converted.

EXAMPLE III

In another run a reactant mixture was prepared consisting of 1.0 g. of cumene hydroperoxide, 3.0 ml. of polymer grade isoprene and 0.003 g. of molybdenum hexacarbonyl. As in Example I the reaction was carried out under substantially anhydrous conditions in a sealed tube at 100° C. for 30 minutes. It was found that 99.0 weight percent of the cumene hydroperoxide was converted and the total yield of epoxide was 85.3 weight percent based on the amount of hydroperoxide converted with the yield of 3,4-epoxy-2-methyl-1-butene being 17.9 weight percent and the 3,4-epoxy-3-methyl-1-butene being 67.4 weight percent each based on the amount of hydroperoxide converted.

EXAMPLE IV

Another run with the same reactants in the same amounts as in Example III was carried out at 80° C. for 30 minutes. The amount of hydroperoxide converted was 80.0 weight percent and the total epoxide yield based on the amount of hydroperoxide converted was 97.5 weight percent with the yield of 3,4-epoxy-2-methyl-1-butene being 18.5 weight percent and the yield of 3,4-epoxy-3-methyl-1-butene being 79.0 weight percent.

It will be seen from these examples that better yields of epoxide are obtained in the 80° C. to 90° C. range.

The 3,4-epoxy-3-methyl-1-butene was identified by gas chromatography by comparison of retention time with a known sample prepared by the bromohydrin method. In order to analyze the entire epoxidation reaction product mixture, however, the product of the epoxidation reaction was washed with water and it was found that the 3,4-epoxy-3-methyl-1-butene isomer went into the water layer together with the tertiary butyl alcohol produced by the reduction of the tertiary butyl hydroperoxide. It was found that the 3,4-epoxy-3-methyl-1-butene reacts with water at room temperature to give the corresponding diol. The organic layer of the epoxidation product mixture was fractionated in the gas chromatographic column and the pure product was collected. This product was identified by nuclear magnetic resonance spectroscopy and by elemental analysis. It was further identified by chemical analyses. It had a boiling point approximately 2°–3° C. above the known isomer, the 3,4-epoxy-3-methyl-1-butene. It has also been found that the 3,4-epoxy-2-methyl-1-butene can be recovered by conventional distillation methods instead of being separated by gas chromatography from the organic phase.

The 3,4-epoxy-2-methyl-1-butene is characterized by the formula

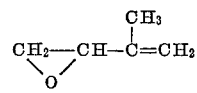

while the known isomeric monomer 3,4-epoxy-3-methyl-1-butene has the formula

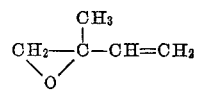

In U.S. Pat. No. 3,031,439 to Bailey there is described the copolymerization of propylene oxide with butadiene monoxide using alkaline earth metal alcoholates to give vulcanizable (by cross linking) copolymers. These copolymers can be cross linked since in the copolymer the butadiene monoxide gives a unit having a reactive vinyl structure because of an allylic hydrogen:

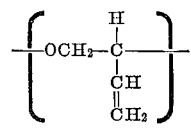

Earlier patents also show the production of cross linkable copolymers by reacting butadiene monoxide with vinyl compounds such as vinyl chloride, vinyl acetate, butadiene, styrene and the like. In all such copolymers the allylic hydrogen structure gives increased reactivity to the vinyl portion of the polymer permitting cross linking.

The monomer of the instant invention likewise has utility for the production of cross linkable homopolymers and copolymers of this invention is superior in this property since its monomeric unit has four allylic hydrogens as shown by this structure

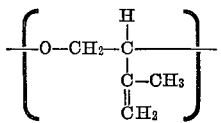

while the isomer known to the prior art is inferior since it has no allylic hydrogen as shown by

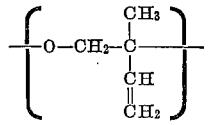

The following example is provided to illustrate the vulcanizable polymers of 3,4-epoxy-2-methyl-1-butene.

EXAMPLE V

The following is charged to a dry Pyrex glass polymerization tube: 20 ml. of dry and purified 1,4-dioxane, 0.16 g. of triisobutylaluminum pyrolate (from the pyrolysis of triisobutylaluminum at a temperature of from about 400° C. to 500° C. for about 6 hours at a pressure of from 200 to 6 p.s.i.g. with heptane as the diluent; further details of this catalyst and its preparation are set forth in co-pending application Ser. No. 619,937 filed Mar. 2, 1967 entitled "Catalysts Based on Aluminum Pyrolate"), 0.17 ml. of dry triethylamine, 50 mmole of dry propylene oxide and 5 mmole of dry 3,4-epoxy-2-methyl-1-butene. The tube is sealed under about 0.2 mm. of pressure and agitated in a controlled temperature bath at 110° C. for 48 hours. The contents of the polymerization tube is added to excess water containing about 50 percent (volume) of HCl to remove diluent and catalyst residues. The copolymer is isolated in greater than 10 percent conversion by filtration, washing and drying of the product. The copolymer is characterized by titration with iodine monochloride. Copolymers and 3,4-epoxy-2-methyl-1-butene with propylene oxide can also be produced utilizing the catalyst set forth in U.S. Pat. No. 3,031,439 (1962), for example, as in Example X of the patent.

The copolymer is converted to a propylene oxide rubber by vulcanization with tetramethyl thiuram monosulfide. Similar systems also may be used in accordance with conventional methods.

The homopolymer of 3,4-epoxy-2-methyl-1-butene is prepared in a similar manner and is vulcanizable.

We claim:
1. The method of producing 3,4-epoxy-2-methyl-1-butene which comprises epoxidizing isoprene by reacting said isoprene with an organic hydroperoxide at a temperature in the range of from 70° C. to 120° C. and under pressure sufficient to maintain the reactants in the liquid phase in the presence of a molybdenum compound soluble in the reaction mixture and in amounts ranging from 20 p.p.m. to 1000 p.p.m. molybdenum by weight based on the weight of the reaction mixture to produce a mixture of 3,4-epoxy-3-methyl-1-butene and 3,4-epoxy-2-methyl-1-butene and the alcohol corresponding to the reduced hydroperoxide, contacting the mixture of 3,4-epoxy-3-methyl-1-butene and 3,4-epoxy-2-methyl-1-butene with water to give an aqueous phase and an organic phase containing only the 3,4-epoxy-2-methyl-1-butene isomer, separating the two phases and recovering the 3,4-epoxy-2-methyl-1-butene from the organic phase.

2. The method according to claim 1 wherein the organic hydroperoxide is tertiary butyl hydroperoxide.

3. The method according to claim 1 wherein the organic hydroperoxide is cumene hydroperoxide.

4. The method according to claim 1 wherein the temperature is in the range of from 80° C. to 90° C.

References Cited

UNITED STATES PATENTS

| 3,351,635 | 11/1967 | Kollar | 260—348.5 |
| 3,031,439 | 4/1962 | Bailey | 260—88.3 |
| 3,019,234 | 1/1962 | Korach et al. | 260—348 |

FOREIGN PATENTS

| 1,086,634 | 10/1967 | Great Britain. |

OTHER REFERENCES

Houben-Weyl: Methoden der Organischen Chemie, vol. 6/3 (1965), pp. 392–402.

Malinovskii, M.S.: Epoxides and Their Derivatives, (1965), pp. 47–52.

Berichte der Deut. Chem. Ges., vol. 66 (1963), pp. 335–
Berichte der Deut. Chem. Ges., vol. 66 (1933), pp. 335–
Chem. Abstracts, vol. 51 (1957), p. 7309.

NORMA S. MILESTONE, Primary Examiner

U.S. Cl. X.R.
260—348, 79.5